United States Patent [19]

Akiyama

[11] Patent Number: 5,534,799
[45] Date of Patent: Jul. 9, 1996

[54] COMPACT FLAG CONTROL CIRCUIT CAPABLE OF PRODUCING A ZERO FLAG IN A SHORT TIME

[75] Inventor: Shin-Ichiro Akiyama, Tokyo, Japan

[73] Assignee: NEC Corporation, Japan

[21] Appl. No.: 113,799

[22] Filed: Aug. 30, 1993

[30] Foreign Application Priority Data

Aug. 31, 1992 [JP] Japan ........................ 4-230818

[51] Int. Cl.[6] .................. H03K 19/08; G06F 9/46
[52] U.S. Cl. .................. 327/20; 327/18; 327/199; 327/403; 395/375
[58] Field of Search ...................... 328/152, 104, 328/154, 137; 307/243, 242, 445; 377/81, 76; 395/375

[56] References Cited

U.S. PATENT DOCUMENTS

| | | | |
|---|---|---|---|
| 4,314,164 | 2/1982 | Tin et al. ........................... | 328/445 |
| 5,220,656 | 6/1993 | Itomitsu et al. ................... | 395/325 |
| 5,282,210 | 1/1994 | Siegel et al. ...................... | 307/243 |
| 5,295,174 | 3/1994 | Shimizu ............................ | 307/242 |
| 5,349,687 | 9/1994 | Ehlig et al. ....................... | 395/800 |

Primary Examiner—Timothy P. Callahan
Assistant Examiner—Dinh T. Le
Attorney, Agent, or Firm—Whitham, Curtis, Whitham & McGinn

[57] ABSTRACT

In a flag control circuit successively supplied with first and second input flag signals produced in relation to first and second results of calculations in an arithmetic and logic unit to produce a final output flag signal, the first input flag signal is latched by a primary flag signal latching circuit while the second input flag signal is latched by the secondary flag signal latching circuit. The first latched flag signal and the second latched flag signal are ANDed by an AND gate circuit to produce the final output flag signal.

9 Claims, 2 Drawing Sheets

COMPACT FLAG CONTROL CIRCUIT CAPABLE OF PRODUCING A ZERO FLAG IN A SHORT TIME

BACKGROUND OF THE INVENTION

The present invention relates to a flag control circuit which is contained in a central processing unit (CPU) in a single chip microcomputer to control a flag.

In general, such a single chip microprocessor comprises an arithmetic and logic unit (ALU) included in a central processing unit operated in accordance with a microprogram. The ALU carries out an arithmetic and logic operation in connection with a pair of data signals each of which is composed of a predetermined number of bits, for example, sixteen (16) bits. The predetermined number of bits may be referred to as a predetermined bit length.

It often happens that the ALU should process a data signal which is longer than the predetermined bit length and which may have a bit length of, for example, twenty-four (24) bits. In this event, the ALU usually executes a calculation by dividing the bit length of the data signal into a lower digit part of, for example, sixteen bits and a higher digit part of, for example, eight (8) bits.

Under the circumstances, it is necessary to monitor specific states, for example, null states in the lower and the higher digit parts so as to decide a branch point in a sequencer operated by the microprogram. To this end, a flag which may be called a zero flag is produced under control of the microprogram to specify the null states which occur in the lower and the higher digit parts. The zero flag may take a predetermined logic level, for example, a logic "1" level.

More specifically, a calculation for the lower digit part is executed to produce a first zero flag signal when the lower digit part is representative of the null state. The first zero flag signal is then supplied to the sequencer which decides a first branch point in the microprogram with reference to the first zero flag signal.

Thereafter, another calculation for the higher digit part is executed to produce a second zero flag signal when the higher digit part is representative of a null state. The second zero flag signal is also supplied to the sequencer. The sequencer decides a next branch point in the microprogram with reference to the second zero flag signal.

A final branch point is determined after production of the first and the second zero flag signals.

Thus, according to the above-mentioned conventional flag control, a state of a zero flag must be checked so as to decide the branch point in accordance with the microprogram which may be considered as software.

Such use of software or firmware makes a microprogram control complicated, since steps are inevitably increased in number in the microprogram. This results in an increase of clocks and undesirably lengthens a calculation of the bit length of the above-mentioned 24 bits. In other words, it is difficult to obtain the final zero flag in a short time, when the above-described calculation over the bit length of 24 bits is executed.

SUMMARY OF THE INVENTION

It is therefore an object of this invention to provide a compact flag control circuit which can quickly determine a final branch point, even when a data signal has a bit length longer than a bit length which can be processed in an ALU.

Other objects of this invention will become clear as the description proceeds.

On describing the gist of this invention, it is possible to understand that a flag control circuit is successively supplied with first and second input flag signals produced in relation to first and second results of calculations in the arithmetic and logic unit to produce a final output flag signal concerned with the first and the second input flag signals.

According to this invention, the flag control circuit comprises a primary flag signal latching circuit for latching the first input flag signal to produce a first latched flag signal, a secondary flag signal latching circuit for latching the second input flag signal to produce a second latched flag signal, and a logic circuit for logically processing both the first latched flag signal and the second latched flag signal to produce the final output flag signal.

The first and the second results correspond to a lower digit part and a higher digit part obtained by the calculations in the arithmetic and logic unit, respectively, each of the first and the second input flag signals takes a predetermined logic level when the lower digit part and the higher digit part are null, respectively.

The logic circuit may comprise an AND gate circuit connected to the primary zero flag latching circuit and the secondary zero flag latching circuit for producing an AND output signal in response to the first and the second latched flag signals, and selecting means supplied with the second zero flag signal and the AND output signal for selecting either one of the second zero flag signal and the AND output signal to produce the output flag signal.

DESCRIPTION OF THE PREFERRED EMBODIMENTS

Figure 1:
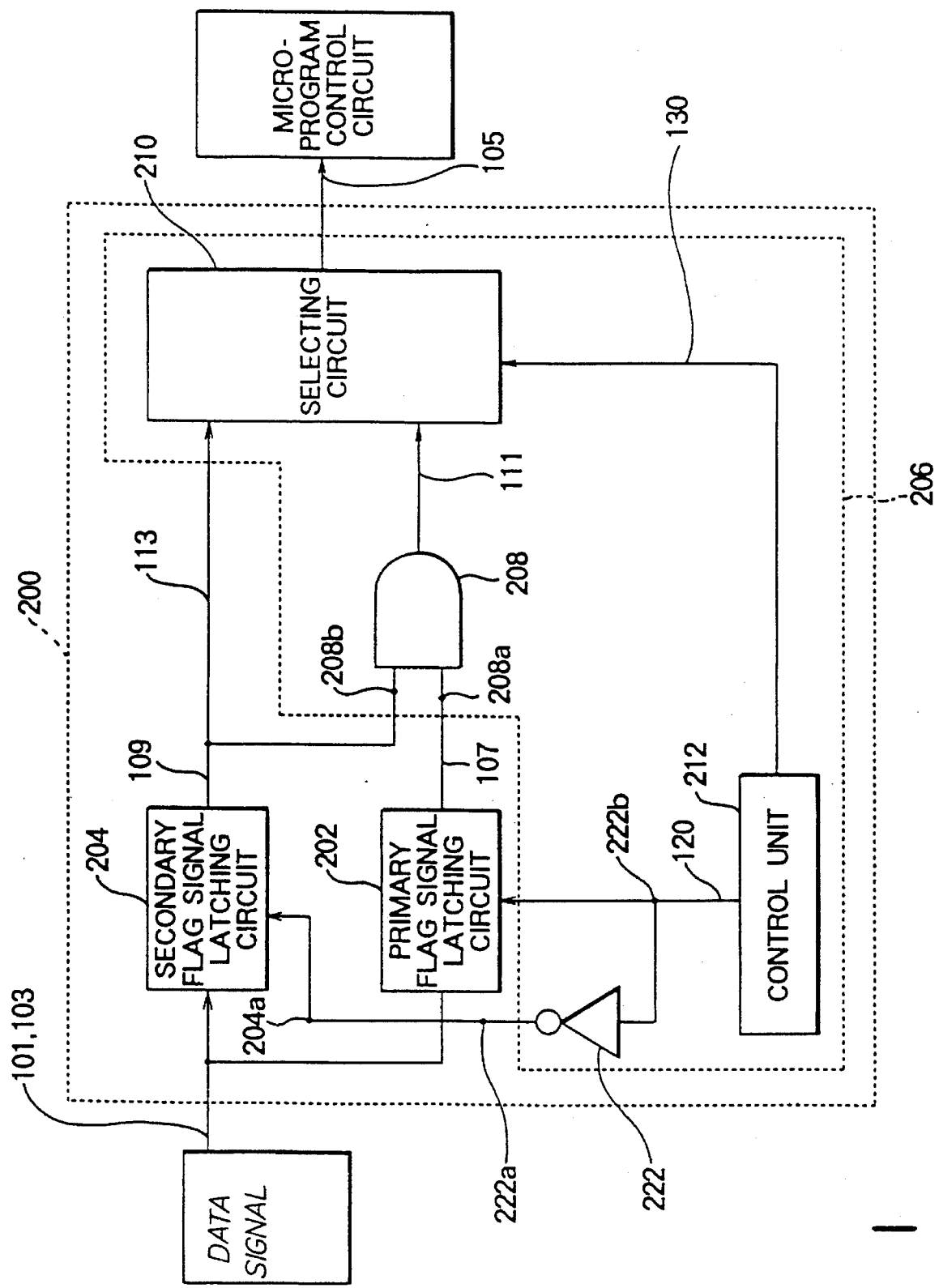
FIG. 1 shows a circuit arrangement of a flag control circuit according to a first embodiment of this invention.

Referring to FIG. 1, description is made about a flag control circuit according to a first embodiment of this invention.

As illustrated in FIG. 1, the flag control circuit is connected between an arithmetic and logic unit (ALU) and a microprogram control circuit. It is presumed that the illustrated ALU can carry out not only a first logical operation related to a data signal of a predetermined bit length but also a second logical operation related to another data signal of a bit length longer than the predetermined bit length. Without loss of generality, the predetermined bit length may be considered as being equal to sixteen bits while the longer bit length may be considered as being equal to twenty-four bits. During the second logical operation, calculation is carried out by dividing the data signal into a lower digit part of sixteen bits and a higher digit part of eight bits.

In addition, it is also presumed that the ALU produces a first input zero flag signal of, for example, a logic "1" level when a result in the ALU is null on execution of the first logical operation. Furthermore, the ALU is assumed to successively produce the first zero flag signal 101 and a second zero flag signal when the lower and the higher digit parts are null, respectively, during the second logical operation. Such first and second zero flag signals 101 and 103 serve to determine branch positions in the microprogram. In other words, the first and the second zero flag signals 101 and 103 are produced in relation to first and second results of the first and the second logical operations in the ALU.

For brevity of description, let the ALU carry out the second logical operation and successively supply the first and the second input zero flag signals 101 and 103 to the flag control circuit 200. The flag control circuit 200 produces a final output flag signal determined by the first and the second input zero flag signals 101 and 103.

The flag control circuit 200 comprises a primary zero flag signal latching circuit 202 for latching the first input zero flag signal 101 to produce a first latched zero flag signal 107, a secondary zero flag signal latching circuit 204 for latching the second input zero flag signal 103 to produce a second latched zero flag signal 109, and a logic circuit 206 for logically processing both the first latched zero flag signal 107 and the second latched zero flag signal 109 to produce the final output zero flag signal 105.

In the illustrated example, the logic circuit 206 comprises an AND gate circuit 208 and a selecting circuit 210. The AND gate circuit 208 has a first AND input terminal 208a connected to an output of the primary zero flag latching circuit 202 and a second AND input terminal 208b connected to an output of the secondary zero flag latching circuit 204 and produces an AND output signal 111 representative of an AND operation between the first and the second input flag signals. The selecting circuit 210 selects either the second latched zero flag signal 113 or the AND output signal 111 to produce a selected signal as the final output flag signal 105.

The logic circuit 206 further comprises a control unit 212 for producing a latch control signal 120 and an output selecting signal 130, and an inverter 222 having an output terminal 222a connected to a first input terminal 204a of the secondary zero flag latching circuit 204 and an input terminal 222b connected to an output terminal of the control unit 212.

Now, description will proceed to a detail of a circuit arrangement of the flag control circuit 200.

In the illustrated example, first and second zero flag signals obtained from the ALU are supplied to both the primary and the secondary zero flag signal latching circuits 202 and 204. The secondary zero flag signal latching circuit 204 is connected to the AND gate circuit 208 in addition to the selecting circuit 210. On the other hand, the primary zero flag signal latching circuit 202 is connected only to the AND gate circuit 208 which is connected to the selecting circuit 210, as shown in FIG. 1.

The latch control signal 120 produced by the control unit 212 is supplied directly to the primary zero flag signal latching circuit 202 and to the secondary zero flag signal latching circuit 204 through the inverter 222.

The above-mentioned zero flag signals are latched by the primary zero flag signal latching circuit 202 when the latch control signal 120 takes a logic "1" level. On the other hand, the zero flag signals are latched by the secondary zero flag signal latching circuit 204 when the latch control signal 120 takes a logic "0" level.

The output selecting signal 130 which is also produced by the control unit 212 is supplied to the selecting circuit 210. In the selecting circuit 210, the AND output signal 111 is selected as the final output zero flag signal 105 when the output selecting signal 130 takes a logic "1" level. On the contrary, the second zero flag signal 113 is selected as the final output zero flag signal 105 when the output selecting signal 130 takes a logic "0" level.

Next, description will be made of the operation of the flag control circuit 200. Herein, it is surmised that the ALU can carry out the calculation in connection with a data signal having a predetermined length of, for example, 16 bits in a usual state.

At first, let the ALU execute a general calculation concerned with a data signal of 16 bits.

In such a case, a zero flag signal is produced from the ALU as the second input zero flag signal and is latched by the secondary zero flag signal latching circuit 204 when the latch control signal 120 is kept at the logic "0" level. In the selecting circuit 210, the second input zero flag signal 109 is selected as the final output zero flag signal 106 when the output selecting signal 130 is kept at the logic "0" level. The second input zero flag signal 109 selected as the final output zero flag signal 105 is then supplied to a microprogram control circuit, as illustrated in FIG. 1.

Next, let the ALU execute another calculation concerned with a data signal of 24 bits. Namely, it is assumed that the ALU carries out a calculation in connection with a data signal which has a bit length longer than the predetermined bit length of 16 bits determined in the ALU.

In this case, a calculation for a lower digit part of 16 bits is at first executed to produce the first zero flag signal 101 which takes a predetermined logic level, depending on whether or not the lower digit part is representative of a null state. Specifically, the first input zero flag signal 101 appears and takes the logic "1" level when the lower digit part is null. The first input zero flag signal 101 is then supplied to the flag control circuit 200. Within the flag control circuit 200, the first zero flag signal 101 is latched by the primary zero flag signal latching circuit 202 to produce a first latched zero flag signal 107 in response to the latch control signal 120 of the logic "1" level.

Thereafter, a further calculation for a higher digit part of 8 bits is executed in the ALU to produce the second input zero flag signal 103 of the logic "1" level, when the higher digit part is null. The second input zero flag signal 103 is also supplied to the flag control circuit 200. Within the flag control circuit 200, the second zero flag signal 103 is latched by the secondary zero flag signal latching circuit 204 to produce the second latched zero flag signal 109 in response to the latch control signal 120 of the logic "0" level.

Then, both the first and the second latched zero flag signals 107 and 109 are logically processed by the logic circuit 206 to produce the final output zero flag signal 105. To describe more in detail, both the first and the second latched zero flag signals 107 and 109 are ANDed by the AND gate circuit 208 to produce the AND output signal 111. The AND output signal 111 is supplied to the selecting circuit 210. In the selecting circuit 210, the AND output signal 111 is selected as the final output zero flag signal 105 in response to the output selecting signal 130 of the logic "1" level.

The final output zero flag signal 105 is then supplied to the microprogram control circuit, as illustrated in FIG. 1.

Thus, according to the flag control circuit 200, a state of a flag may not be checked. In other words, the branch point may not be decided by the microprogram. The resultant microprogram control becomes very simple, since the steps in the microprogram can be decreased in number considerably. This means that clocks can be efficiently decreased in number so as to decide the branch point. After all, it is possible to determine the final zero flag in a short time, even when the above-described calculation of the bit length of 24 bits is executed in the ALU.

Figure 2:
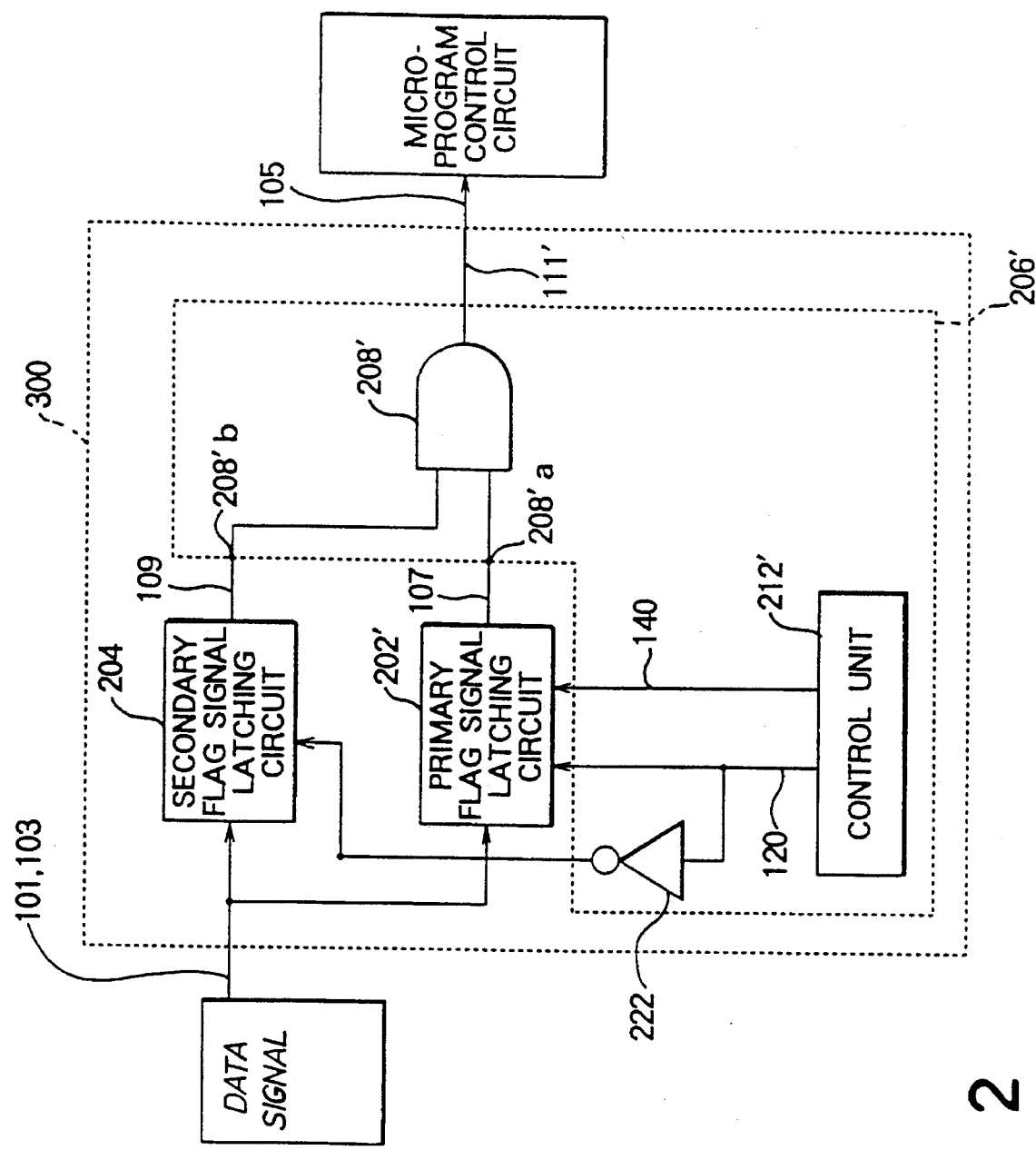
FIG. 2 shows a circuit arrangement of a flag control circuit according to a second embodiment of this invention.

Referring to FIG. 2, description is made about a flag control circuit according to a second embodiment of this invention.

As illustrated in FIG. 2, the flag control circuit 300 according to the second embodiment is similar in structure to that illustrated in FIG. 1 except that the selecting circuit 210 illustrated in FIG. 1 is omitted from FIG. 2. In this connection, the flag control circuit 300 has a logic circuit 206' somewhat modified from the logic circuit 206 (FIG. 1) and a primary zero flag latching circuit 202' operable in a manner different from the latching circuit 202 (FIG. 1). Specifically, the logic circuit 206' comprises an AND gate circuit 208' having a first AND input terminal 208'a connected to the primary zero flag latching circuit 202' and a second AND input terminal 208'b connected to the secondary zero flag latching circuit 204. The AND gate circuit 208' produces an AND output signal 111' as the output zero flag signal 105 which is delivered to the microprogram control circuit.

The logic circuit 206' comprises a control unit 212' for producing a reset signal 140 supplied to the primary zero flag latching circuit 202' in addition to the latch control signal 120. The primary zero flag latching circuit 202' is operated in the manner identical with the primary zero flag latching circuit 202 illustrated in FIG. 1 while the reset signal 140 takes a logic "0" level. On the other hand, the primary zero flag latching circuit 202' produces an output signal of the logic "1" level when the reset signal 140 takes the logic "1" level.

Now, description will be made of the operation of the flag control circuit 300.

When the general calculation for a data signal of 16 bits is executed, a zero flag signal obtained from the ALU is latched by the secondary zero flag signal latching circuit 204 to produce the latched zero flag signal in response to the latch control signal 120 which is kept at the logic "0" level. The primary zero flag latching circuit 202' produces the output signal of the logic "1" level in response to the reset signal 140 which is kept at the logic "1" level. As a result, the latched zero flag signal and the output signal both of which take the logic "1" levels are given to the AND gate circuit 208' to subject an AND function therebetween and to produce the AND output signal 111' representative of the output zero flag signal 105.

On the other hand, when another calculation for a data signal of 24 bits is executed by the ALU, a calculation is at first carried out in connection with a lower digit part of 16 bits. As a result, the ALU produces the first zero flag signal 101 which takes a predetermined logic level, namely, the logic "1" level, depending on whether or not the lower digit part is representative of a null state. The first zero flag signal 101 is then supplied to the flag control circuit 300. Within the flag control circuit 300, the first zero flag signal 101 is latched by the primary zero flag signal latching circuit 202' to produce a first latched zero flag signal 107 in response to the latch control signal 120 of the logic "1" level, since the reset signal 140 is kept at the logic "0" level.

Thereafter, a further calculation for a higher digit part of 8 bits is executed to produce the second zero flag signal 103 of the predetermined logic level, namely, the logic "1" level, when the higher digit part is completely null. The second zero flag signal 103 of the logic "1" level is also supplied to the flag control circuit 300. Within the flag control circuit 300, the second zero flag signal 103 is latched by the secondary zero flag signal latching circuit 204 to produce the second latched zero flag signal 109 in response to the latch control signal 120 which is kept at the logic "0" level, since the reset signal 140 takes the logic "0" level.

Then, both the first and the second latched zero flag signals 107 and 109 are logically processed to produce the final output zero flag signal 105. To describe more in detail, both the first and the second latched zero flag signals 107 and 109 are subjected to AND operation by the AND gate circuit 208' to be produced as the AND output signal 111'. The AND output signal 111' is supplied as the final output zero flag signal 105 to the microprogram control circuit, as illustrated in FIG. 2.

While this invention has thus far been described in conjunction with only two embodiments thereof, it will readily be possible for those skilled in the art to put this invention into practice in various other manners. For example, a flag control circuit according to this invention may be applied for controlling some flag other than the zero flag, such as a carry flag and the like.

What is claimed is:

1. A microcomputer comprising:

an arithmetic and logic unit (ALU) for carrying out an arithmetic and logic operation in connection with a data signal, said data signal having a bit length greater than a bit length capacity of said ALU, said ALU processing the data signal by dividing the data signal into a lower digit portion having a bit length equal to said bit length capacity of said ALU to produce a first flag signal at a first predetermined logic level and a higher digit portion having a bit length equal to a number of bits exceeding said bit length capacity of said ALU to produce a second flag signal at a second predetermined logic level;

a flag control circuit successively supplied with said first and second flag signals from said ALU, said first and second flag signals corresponding to first and second results of calculations in said ALU, said flag control circuit producing an output flag signal in response to said first and said second flag signals, said first and said second results respectively corresponding to the lower digit portion and the higher digit portion obtained by the calculations of said ALU; and a microprogram control circuit responsive to said output flag signal to control a branch point in a microprogram of said microcomputer:

said flag control circuit comprising:

a primary flag signal latching circuit for latching said first flag signal to produce a first latched flag signal;

a secondary flag signal latching circuit for latching said second flag signal to produce a second latched flag signal; and a logic circuit for logically processing both said first latched flag signal and said second latched flag signal to produce said output flag signal.

2. A microcomputer as claimed in claim 1, wherein said logic circuit of said flag control circuit comprises:

an AND gate circuit connected to said primary flag signal latching circuit and said secondary flag signal latching circuit for producing an AND output signal in response to said first and said second latched flag signals; and selecting means supplied with said second latched flag signal and said AND output signal for selecting one of said second latched flag signal and said AND output signal to produce said output flag signal.

3. A microcomputer as claimed in claim 2, wherein said logic circuit further comprises:

control means for controlling said primary and said secondary flag signal latching circuits to selectively store said first and said second flag signals in said primary and said secondary flag signal latching circuits.

4. A microcomputer as claimed in claim 3, wherein said logic circuit further comprises:

an inverter circuit between said control means and said secondary flag signal latching circuit for inverting a control signal supplied to said secondary flag signal latching circuit, to store said second flag signal in said secondary flag signal latching circuit in timed relation to said control signal inverted by said inverter circuit.

5. A microcomputer as claimed in claim 1, wherein said logic circuit of said flag control circuit comprises:

an AND gate circuit connected to said primary flag signal latching circuit and said secondary flag signal latching circuit for producing an AND output signal representative of said output flag signal.

6. A microcomputer as claimed in claim 5, wherein said logic circuit further comprises:

control means for controlling said primary and said secondary flag signal latching circuits to selectively store said first and said second flag signals in said primary and said secondary flag signal latching circuits, said control means selectively controlling said primary flag signal latching circuit to produce either said first latched flag signal or an output signal having a predetermined logic level.

7. A microcomputer as claimed in claim 6, wherein said logic circuit further comprises:

an inverter circuit between said control means and said secondary flag signal latching circuit for inverting said control signal given to said secondary flag signal latching circuit, to store said second flag signal in said secondary flag signal latching circuit in timed relation to said control signal inverted by said inverter circuit.

8. A flag control circuit connected to an arithmetic and logic unit (ALU), for enabling said ALU to process a data signal having a bit length greater than a bit length capacity of said ALU by dividing said data signal into a lower bit portion to produce a first flag signal at a first predetermined logic level, and a higher bit portion to produce a second flag signal at a second predetermined logic level, said flag control circuit for receiving said supplied first and second flag signals from said ALU, said first and second flag signals corresponding to first and second results of calculations in said ALU of said lower bit portion and a higher bit portion, respectively, said flag control circuit producing an output flag signal in response to said first and said second flag signals, said flag control circuit comprising:

a primary flag signal latching circuit for latching said first flag signal to produce a first latched flag signal;

a secondary flag signal latching circuit for latching said second flag signal to produce a second latched flag signal;

an AND gate circuit connected to said primary flag signal latching circuit and said secondary flag signal latching circuit for producing an AND output signal in response to said first and said second latched flag signals;

selecting means supplied with said second latched flag signal and said AND output signal for selecting one of said second latched flag signal and said AND output signal to produce said output flag signal; and control means for controlling said primary and said secondary flag signal latching circuits to selectively store said first and said second flag signals in said primary and said secondary signal latching circuits.

9. A flag control circuit connected to an arithmetic and logic unit (ALU), for enabling said ALU to process a data signal having a bit length greater than a bit length capacity of said ALU by dividing said data signal into a lower bit portion to produce a first flag signal at a first predetermined logic level, and a higher bit portion to produce a second flag signal at a second predetermined logic level, said flag control circuit for receiving said supplied first and second input flag signals from said ALU, said first and second flag signals corresponding to first and second results of calculations in said ALU of said lower bit portion and a higher bit portion, respectively, said flag control circuit producing an output flag signal in response to said first and said second flag signals, said flag control circuit comprising:

a primary flag signal latching circuit for latching said first flag signal to produce a first latched flag signal;

a secondary flag signal latching circuit for latching said second flag signal to produce a second latched flag signal;

an AND gate circuit connected to said primary flag signal latching circuit and said secondary flag signal latching circuit for producing an AND output signal representative of said output flag signal; and control means for controlling said primary and said secondary flag signal latching circuits to selectively store said first and said second flag signals in said primary and said secondary signal latching circuits, said control means selectively controlling said primary flag signal latching circuit to produce either said first latched flag signal or an output signal having a predetermined logic level.

* * * * *